No. 853,673. PATENTED MAY 14, 1907.
H. F. BICKEL.
AIR BRAKE APPARATUS.
APPLICATION FILED MAY 28, 1906.

Witnesses
Jas. J. Maloney

Inventor:
Henry F. Bickel.
by Bakewell & Byrnes
Attys.

UNITED STATES PATENT OFFICE.

HENRY F. BICKEL, OF PLAINFIELD, NEW JERSEY, ASSIGNOR TO NEW YORK AIR BRAKE COMPANY, A CORPORATION OF NEW JERSEY.

AIR-BRAKE APPARATUS.

No. 853,673.        Specification of Letters Patent.        Patented May 14, 1907.

Application filed May 28, 1906. Serial No. 319,082.

*To all whom it may concern:*

Be it known that I, HENRY F. BICKEL, a citizen of the United States, residing in Plainfield, in the county of Union, and State of New Jersey, have invented an Improvement in Air-Brake Apparatus, of which the following description in connection with the accompanying drawings is a specification, like letters on the drawings representing like parts.

This invention relates to an air brake apparatus, and especially to a brake cylinder pressure controlling valve which is especially desirable in connection with brakes designed for operating with high speed trains.

The brake cylinder pressure controlling device or relief valve forming the subject of this invention contains provisions for relieving the brake cylinder pressure when it rises to a desired predetermined amount in making normal or service applications of the brakes, and also for causing a higher pressure to be retained for a short period of time when an emergency application of the brakes is made, at the end of which period of time the pressure has been relieved or reduced to the amount normally provided for in service applications of the brakes.

Figure 1:
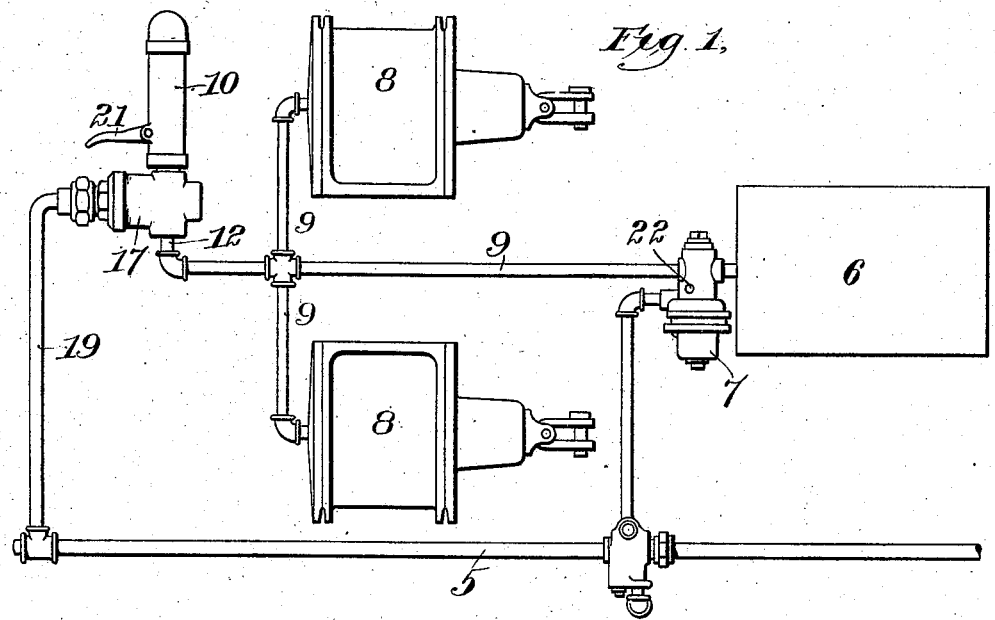
Figure 2:
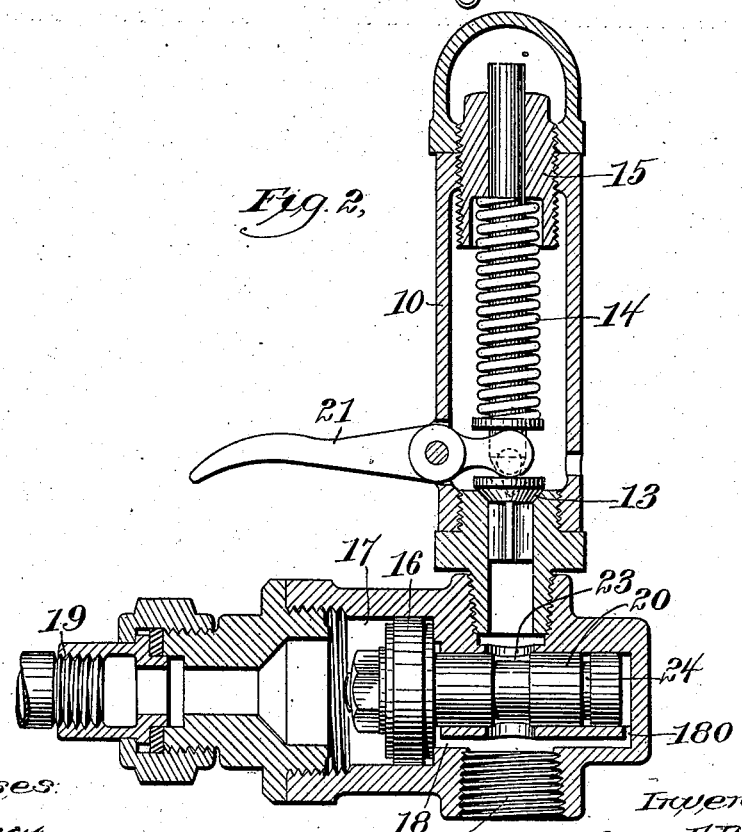

Figure 1 is a diagram showing a sufficient portion of an air brake apparatus to illustrate the application of the brake cylinder pressure controlling appliance in coöperation therewith; and Fig. 2 is a longitudinal section of a brake cylinder pressure controlling appliance embodying this invention.

The pressure controlling appliance to which this invention especially relates is represented in Fig. 1 as employed in connection with the driver brakes of a locomotive forming a part of an automatic air brake system comprising the usual train pipe 5, communicating with an auxiliary reservoir 6, pertaining to each brake equipment, under control of the triple valve 7, which also governs the admission of air to the brake cylinder or cylinders 8, from the auxiliary reservoir 6, through the pipe or communication 9, and also controls the discharge of air from the brake cylinders through the triple valve exhaust port 22 in the usual manner, these parts being all of any suitable or usual construction, such as is employed in the ordinary well known automatic air brake apparatus now in general use. The triple valve may be of the quick action type which operates in response to a sudden and considerable reduction in train pipe pressure to vent the train pipe locally, or a plain triple valve may be used.

When designed for employment in connection with high speed trains, the air brake apparatus is commonly used with a higher pressure in the system than has been generally employed on freight trains and passenger trains not commonly run at an exceptionally high rate of speed. It is desirable, and more especially so with high speed apparatus, or apparatus in which the system is normally charged to a higher pressure than usual, say, for example, to one hundred pounds in the train pipe and auxiliary reservoirs, to provide means for preventing the pressure in the brake cylinders exceeding a predetermined amount, and this is provided for in accordance with the present invention by a relief valve 10 communicating, through passage 12, with the brake cylinders 8, so that the brake cylinder pressure normally acts upon the relief valve proper 13 (see Fig. 2) in a direction to unseat it, said valve being retained seated by a predetermined force, such as that of a spring 14, the pressure of which may be adjusted to the desired amount by an adjustable spring-abutment 15, and is adjusted to just balance a pressure acting on the valve 13 tending to lift the same, equal to the maximum amount which it is desired to obtain in the brake cylinders in normal service applications of the brakes, which may, for example, be sixty pounds to the square inch.

It is desirable, however, to provide means whereby a higher pressure may be maintained in the brake cylinder for a short period of time in an emergency application of the brakes, and this is provided for in accordance with the present invention by an automatic controlling device governing the communication between the brake cylinder and the relief valve 13, said controlling device being automatically operated in response to an emergency application of the brakes to reduce the effective capacity of the brake cylinder discharge passage, so that the air will be discharged therefrom at a relatively slow rate when the relief valve proper 13 is opened by reason of the brake cylinder pressure being above that which the relief valve is set to retain. Said automatic controller is operated by the preponderance of brake cylinder pressure or train pipe pressure, one relative to the other, by an actuator shown as a piston or movable abutment 16 contained in a cylindrical chamber or casing 17, and exposed at one side to the brake cylinder pressure from the communication 12 between the brake cylinder and relief valve 10 which is in communication by small passage 18 with the chamber 17 in which the piston 16 works. The chamber 17 at the other side of said piston 16 is in communication with the train pipe 5 by the connection 19, and said piston 16 is thus forced to one or to the other end of the chamber 17 according as train pipe pressure or brake cylinder pressure preponderates.

The controller of the brake cylinder discharge passage operated by the piston 16 is shown as a plug or plunger 20 connected with said piston 16 and working in a passage transverse to the brake cylinder passage 12 such that the plunger 20, if fully fitting or filling the passage in which it works, would wholly close the brake cylinder discharge passage through the relief valve 10. Said plunger 20 is, however, provided with transverse passages 23 and 24, shown as annular grooves around the periphery of said plunger, such that when either of said grooves is in communication with the passage 12 from the brake cylinder to the relief valve proper 13, said groove will afford a passage through which the brake cylinder air may escape, when the relief valve is open. A passage 180 admits brake cylinder air to act on the end of the plunger 20, thus making the area subjected to brake cylinder pressure equal to that subjected to train pipe pressure acting in the opposite direction on the piston 16.

In making service applications of the brakes, the train pipe pressure ordinarily remains in excess of brake cylinder pressure until maximum brake cylinder pressure is attained, and the piston 16 will thus be retained in the position shown in the drawing, with the communicating groove 23 of the controller 20 in position to provide for the outflow of air from the brake cylinder, and said groove 23 is of sufficient size to admit of the brake cylinder pressure being relieved promptly, if it should rise above the predetermined amount normally retained by the relief valve proper 13.

In an emergency application of the brakes, however, the train pipe pressure is suddenly greatly reduced, and the brake cylinder pressure is almost instantly raised to the maximum amount obtainable, which is commonly considerably above that normally provided for in service applications, and is above that at which the relief valve proper 13 is set to open. Under these conditions, the excess of brake cylinder pressure over train pipe pressure acting upon the piston 16 of the automatic controller shifts the latter practically instantaneously to the position in which the plunger 20 closes the brake cylinder discharge passage, except for the communication afforded by the groove 24 which is, by this operation, brought into communication with the brake cylinder discharge passage 12. This groove or communication 24 past the plunger 20 is made relatively small, so that the plunger, when in this position, reduces the effective capacity of the discharge or relief passage and thus retards the outflow of air from the brake cylinder when it acquires a pressure sufficient to open the relief valve proper 13, and, consequently, the higher pressure in the brake cylinder above that at which the relief valve is set to open will be retained during the period required for flowing out through the relatively small passage 24.

The larger passage which is normally provided by the groove 23 in service applications may be of a capacity practically as great as that of the passage by which air is admitted to the brake cylinder in service applications, and, consequently, if air continues to be admitted to the brake cylinder after the desired normal maximum pressure has been obtained, it will be discharged practically as fast as admitted, and the brake cylinder will have been properly relieved before the controlling device is shifted, if, in making a service application, the train pipe pressure should be finally reduced substantially below the normal maximum brake cylinder pressure.

The relief valve proper is shown as provided with a handle or lifting lever 21 which may be operated manually to reduce the brake cylinder pressure any desired amount when the said appliance is located in an accessible position, as would commonly be the case when it is employed in connection with the driver brake equipment of a locomotive.

What I claim is:

1. The combination of a brake cylinder provided with a relief passage and a relief valve adapted to be opened at predetermined pressure with an independently operated automatic controller for varying the effective capacity of said relief passage, substantially as and for the purpose described.

2. The combination with a relief valve adapted to be opened at predetermined pressure, with an automatic controller and actuator therefor acted upon by brake cylinder pressure and train pipe pressure, whereby the effective capacity of the discharge passage from the brake cylinder is diminished when brake cylinder pressure exceeds train pipe pressure, substantially as described.

3. The combination of a brake cylinder provided with a relief passage and a relief valve adapted to be opened at predetermined pressure; with an automatic controller movable independently of said relief valve and operated in response to an emergency application of the brakes to render the relief passage of relatively small effective capacity, substantially as and for the purpose described.

4. The combination of the brake cylinder relief valve with an automatic controller having provision for varying the effective capacity of the brake cylinder discharge passage, and a movable abutment for actuating said controller acted upon in one direction by the pressure in the brake cylinder, and in the other direction by the pressure in the train pipe, substantially as described.

In testimony whereof, I have signed my name to this specification in the presence of two subscribing witnesses.

HENRY F. BICKEL.

Witnesses:
   JNO. F. MALONEY,
   W. F. NICOL.